United States Patent
Song et al.

(10) Patent No.: US 6,347,336 B1
(45) Date of Patent: Feb. 12, 2002

(54) AUTOMATIC DISCOVERY AND POSITIONING METHOD OF THE NETWORK ELEMENTS IN THE NETWORK MANAGEMENT SYSTEM IN CASE THAT THE NETWORK TOPOLOGY IS CONFIGURED

(75) Inventors: Jee-Hoon Song, Sungnam; Young-Hyun Kang, Seoul; Cheong-Rim Choi, Yongin, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/287,084

(22) Filed: Apr. 6, 1999

(30) Foreign Application Priority Data

Apr. 6, 1998 (KR) .............................................. 98-12039

(51) Int. Cl.[7] .......................... G06F 11/32; H04L 12/28
(52) U.S. Cl. ...................... 709/223; 709/224; 370/254; 345/735
(58) Field of Search ................................ 370/258, 257, 370/254; 709/223, 224; 345/733, 734, 735, 736

(56) References Cited

U.S. PATENT DOCUMENTS

| | | | | |
|---|---|---|---|---|
| 5,182,747 A | * | 1/1993 | Frenzel, III et al. ......... | 370/452 |
| 5,436,748 A | * | 7/1995 | Vinel et al. ................. | 359/125 |
| 5,539,881 A | * | 7/1996 | Hunt et al. .................. | 709/242 |
| 5,546,540 A | * | 8/1996 | White ......................... | 709/223 |
| 5,684,959 A | * | 11/1997 | Bhat et al. .................. | 709/224 |
| 5,732,086 A | * | 3/1998 | Liang et al. ................. | 370/410 |
| 5,737,319 A | * | 4/1998 | Croslin et al. .............. | 370/255 |
| 6,055,228 A | * | 4/2000 | DeKoning et al. .......... | 370/258 |
| 6,188,675 B1 | * | 2/2001 | Casper et al. ............... | 370/254 |

FOREIGN PATENT DOCUMENTS

JP            4 152733          5/1992

* cited by examiner

Primary Examiner—Kenneth R. Coulter
(74) Attorney, Agent, or Firm—Robert E. Bushnell, Esq.

(57) ABSTRACT

By using a graphical user interface (GUI) screen, a network operator provides to subscribers service for automatically discovering the configuration management and network topology of Optical network units (ONU's) in a fiber loop carrier-curb system. When a host digital terminal (HDT) or optical network unit connected to a subscriber is added to a fiber loop carrier-curb (FLC-C) or fiber loop carrier-curb management system (FMS), the added network element is displayed on the graphic user interface screen as an icon in a designated position of a network topology. Conversely, when a network element (NE) is deleted from the management system, its corresponding icon is removed from the network topology. A star topology is used as the preferred network topology and configuration method in the present invention. When the star topology is displayed, the host digital terminal is located in the center of a concentric circle, surrounded by a maximum of 16 optical network unit's. Each optical network unit is connected to a host digital terminal and has its own assigned position in the star topology. The position of each optical network unit is determined from the configuration identification information of the optical network unit, which is automatically checked upon addition of the optical network unit to the management system. Using the identification information, the optical network unit automatically is placed in a designated position of the star topology.

16 Claims, 4 Drawing Sheets

FIG. 1 *(Prior Art)*

AUTOMATIC DISCOVERY AND POSITIONING METHOD OF THE NETWORK ELEMENTS IN THE NETWORK MANAGEMENT SYSTEM IN CASE THAT THE NETWORK TOPOLOGY IS CONFIGURED

CLAIM OF PRIORITY

This application makes reference to, incorporates the same herein, and claims all rights accruing thereto under 35 U.S.C. §119 through patent application entitled AUTOMATIC DISCOVERY AND POSITIONING METHOD OF THE NETWORK ELEMENTS IN THE NETWORK MANAGEMENT SYSTEM IN CASE THAT THE NETWORK TOPOLOGY IS CONFIGURED earlier filed in the Korean Industrial Property Office on the 6th day of April 1998 and there duly assigned Ser. No. 1998/12039.

BACKGROUND OF THE INVENTION

1. Field of the Invention

The present invention relates to a method and network for configuring topology in a Fiber loop carrier-curb (FLC-C) management system (FMS), and, more specifically, a method and network for automatically discovering, displaying and automatically positioning added or deleted Network elements (NE's) in a network map topology screen on a configuration management (CM) screens of the management system.

2. Description of the Related Art

One method for discovering a network element is disclosed in the U.S. Pat. No. 5,539,881, NETWORK ELEMENT INCLUDING AUTOMATIC NETWORK ELEMENT IDENTITY INFORMATION REGISTRATION APPARATUS AND METHOD, issued to Hunt Christopher et al., however, only checks whether or not new network elements exist, and can not connect new network elements automatically into a star topology.

Another method is disclosed in the U.S. Pat. No. 5,742,795, METHOD OF INITIALIZING AND UPDATING A NETWORK MODEL, issued to Kussel discloses initialization and updating a network model including forming a network topology in the form of a network graph and basing it on the object of specifying a method which can be realized by a computer program that can be processed with a short computing time, while U.S. Pat. No. 5,737,319, DYNAMIC NETWORK TOPOLOGY DETERMINATION, issued to Croslin et al., discloses a system and method for dynamically determining the physical connection topology between diverse network elements (DNEs) within a communication network. Each of the diverse network elements is audited on a periodic basis to determine the arrangement, configuration, cross-connection, and alarm status of each communication port within each of the diverse network elements in the communications network.

U.S. Pat. No. 5,732,086, SYSTEM AND METHOD FOR DETERMINING THE TOPOLOGY OF A RECONFIGURABLE MULTI-NODAL NETWORK, issued to Liang et al., shows a multi-node network that manifests a changing topology of individual data processing nodes. An originating node transmits an initial identifier (ID) message over each interconnect link that emanates from itself. An update procedure causes the transmitter to transmit to all other nodes, the originating node entry and further causes the topology table entries received from other nodes to be entered in the topology table of the originating node, so that all nodes in the system are enabled to thereafter identify the topology of the system. U.S. Pat. No. 4,644,532, AUTOMATIC UPDATE OF TOPOLOGY IN A HYBRID NETWORK, issued to George et al., maintains topology data bases in control nodes and keeping them current in the face of changes in the network. The method further provides for the selection of a particular control node from which a particular ordinary node that obtains necessary routing information and establishes and maintains communication between the ordinary node and the selected control node. Control nodes identify adjacent control nodes, and upon determining changes in network status, such network status changes are communicated to the adjacent control nodes.

U.S. Pat. No. 5,276,789, GRAPHIC DISPLAY OF NETWORK TOPOLOGY, issued to Besaw et al., automatically lays out and graphically displays the topology of a computer network system. The layout system retrieves a list of the nodes within the network and their interconnections from a database which can be manually built by a network administrator or automatically constructed by other software.

Other effects in the art open the configuration management menu screen; add or delete network elements on the network; notifying the management system of the addition or deletion of the network elements by the FLC-C; receive the notification signal; display the notification information at a fixed position on the configuration management map screen; and poll the corresponding network element. After automatically discovering an addition or deletion of network elements, the information is displayed at a fixed position on the screen in the network map topology of the management system. Because the network elements are displayed at a fixed position, when one or more of the network elements are added or deleted, the management system manager has to manually reorganize or reposition the network map topology for each network element, without knowledge of how many network elements were added or deleted.

In many cases, when using a graphic user interface (GUI) such as a variable visual display, or video monitor, network elements are displayed as icons on the screen. The icons usually display an identification number for each network element, and the network manager cannot be assured where to move the corresponding icons when network elements are added or deleted from the network map topology. Thus, before a network manager may review information for a particular network element, the manager inconveniently has to locate the specific icon on the screen, which may be in no particular order or location.

SUMMARY OF THE INVENTION

It is an object of the present invention to provide an improved network management system.

It is another object to provide a network and method to automatically discover and position network elements them in the form of a star topology on a configuration management screen of a fiber loop carrier-curb (FLC-C) management system (FMS), to allow easy access and identification of the network elements by the network managers.

By using a graphic user interface screen, a network operator provides to subscribers service for automatically discovering the configuration management and network topology of optical network units (ONU's) in a fiber loop carrier-curb system. When a host digital terminal (HDT) or optical network unit connected to a subscriber is added to a fiber loop carrier-curb or management system (FMS), the added network element is displayed on the graphic user interface screen as an icon in a designated position of a network topology. Conversely, when a network element is deleted from the management system, its corresponding icon is removed from the network topology.

A star topology is used as the preferred network topology and configuration method in the present invention. When the star topology is displayed, the host digital terminal is located in the center of a concentric circle, surrounded by a maximum of sixteen optical network unit's. Each optical network unit is connected to a host digital terminal and has its own assigned position in the star topology. The position of each optical network unit is determined from the configuration identification information of the optical network unit, which is automatically checked upon addition of the optical network unit to the management system. Using the identification information, the optical network unit automatically is placed in a designated position of the star topology.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
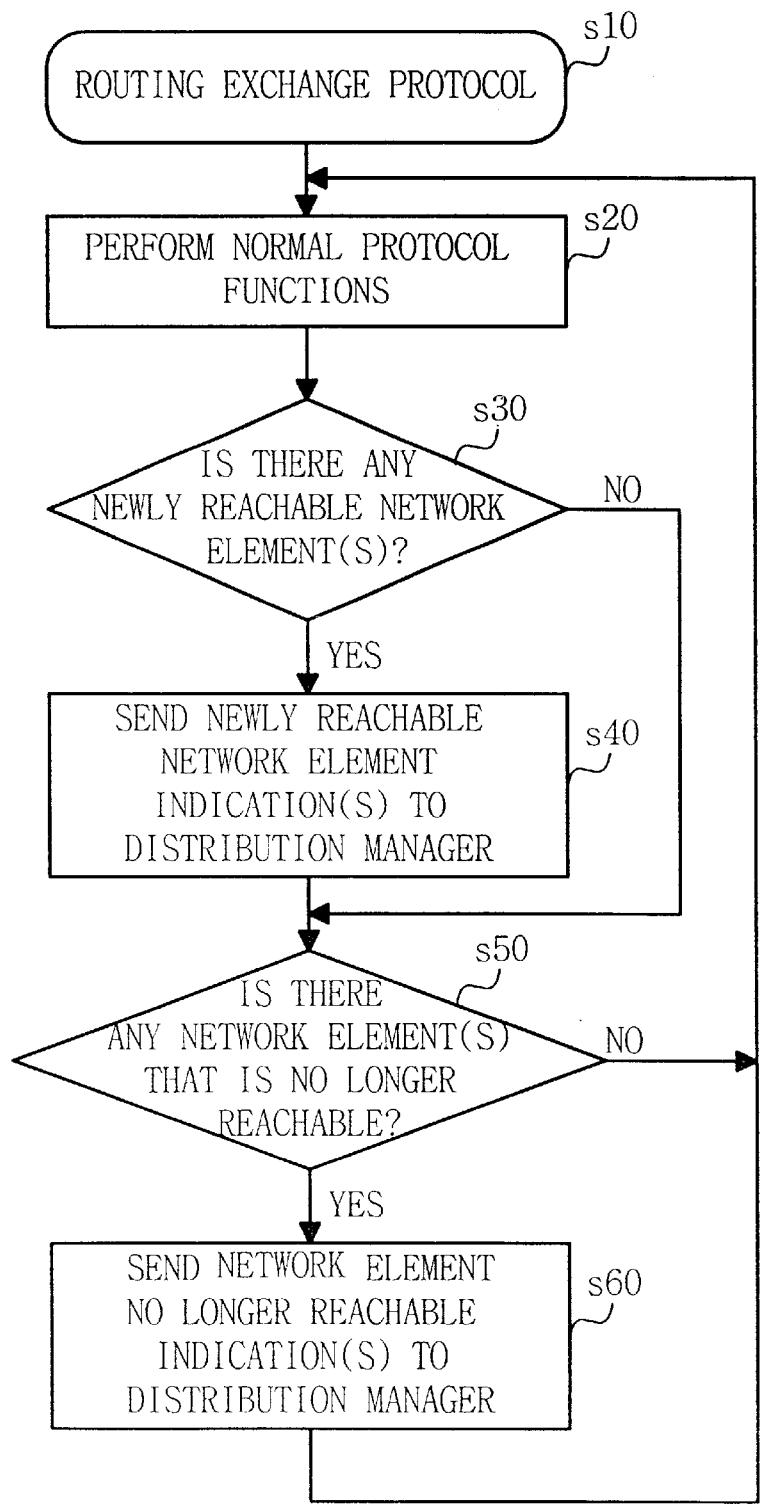
FIG. 1 illustrates a prior art flow chart of a method for discovering the network element.

Referring now to FIG. 1, the prior art comprises the steps of performing the normal protocol functions (s20) by the route exchanging protocol (s10); checking for newly reachable network elements (s30); informing the distribution manager (DM) of the newly reachable network element indication when a new network element is found (s40); when no newly reachable network element is found, checking whether there are any network elements that are no longer reachable (s50); if there are no network elements that are no longer reachable, returning to the step of performing the normal protocol functions (s20); if there are network elements that are no longer reachable, informing the distribution manager of the existence of the no longer reachable network element status (s60). This prior art, however, only checks whether or not new network elements exist, and cannot connect new network elements automatically into a star topology.

Figure 2:
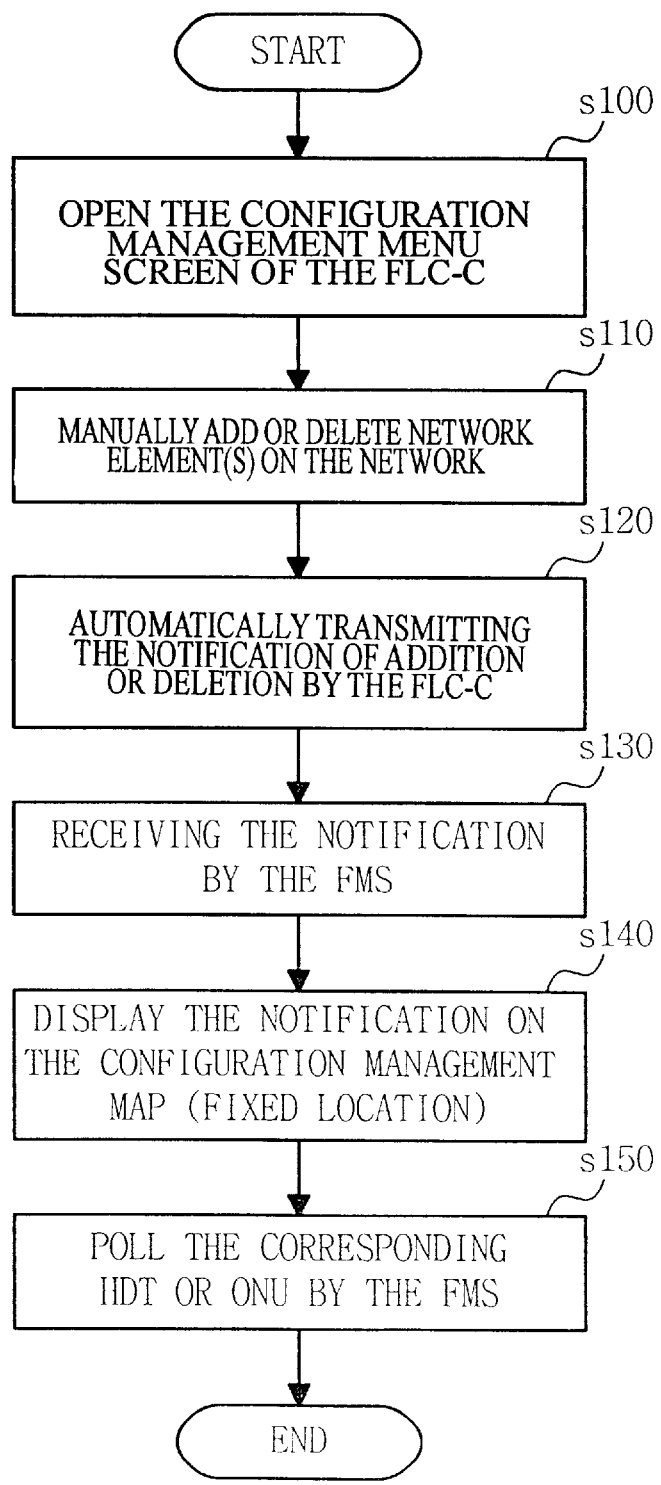
FIG. 2 illustrates another prior art flow chart of a method for discovering the network element.

FIG. 2 shows another flow chart, not intended to be a prior art reference, of a network topology configuration of a management system. The chart comprises the steps of opening the configuration management menu screen of a fiber loop carrier-curb (s100); adding or deleting network elements on the network (s110); notifying the management system of the addition or deletion of the network elements by the fiber loop carrier-curb (s120); receiving the notification signal by the management system (s130); displaying the notification information at a fixed position on the configuration management map screen (s140); and polling the corresponding network element by the management system (s150). After automatically discovering an addition or deletion of network elements, the information is displayed at a fixed position on the screen in the network map topology of the management system. When one or more of the network elements are added or deleted, the management system manager has to manually reorganize or reposition the network map topology for each network element, without knowledge of how many network elements were added or deleted because the network elements are displayed at a fixed position.

A preferred embodiment of the present invention comprises a method for automatic discovery and positioning of network elements in a network management system. The network management system, referred to as a fiber loop carrier-curb network management system, has a host digital terminal (HDT) and a plurality of optical network units (ONU's). The host digital terminal and optical network unit's compose a fiber loop carrier-curb (FLC-C) system, which is a communications device for users of the system. A plurality of fiber loop carrier-curb systems, which are small sized networks or sub-networks, make up the network managed by the fiber loop carrier-curb management system (FMS).

Figure 3:
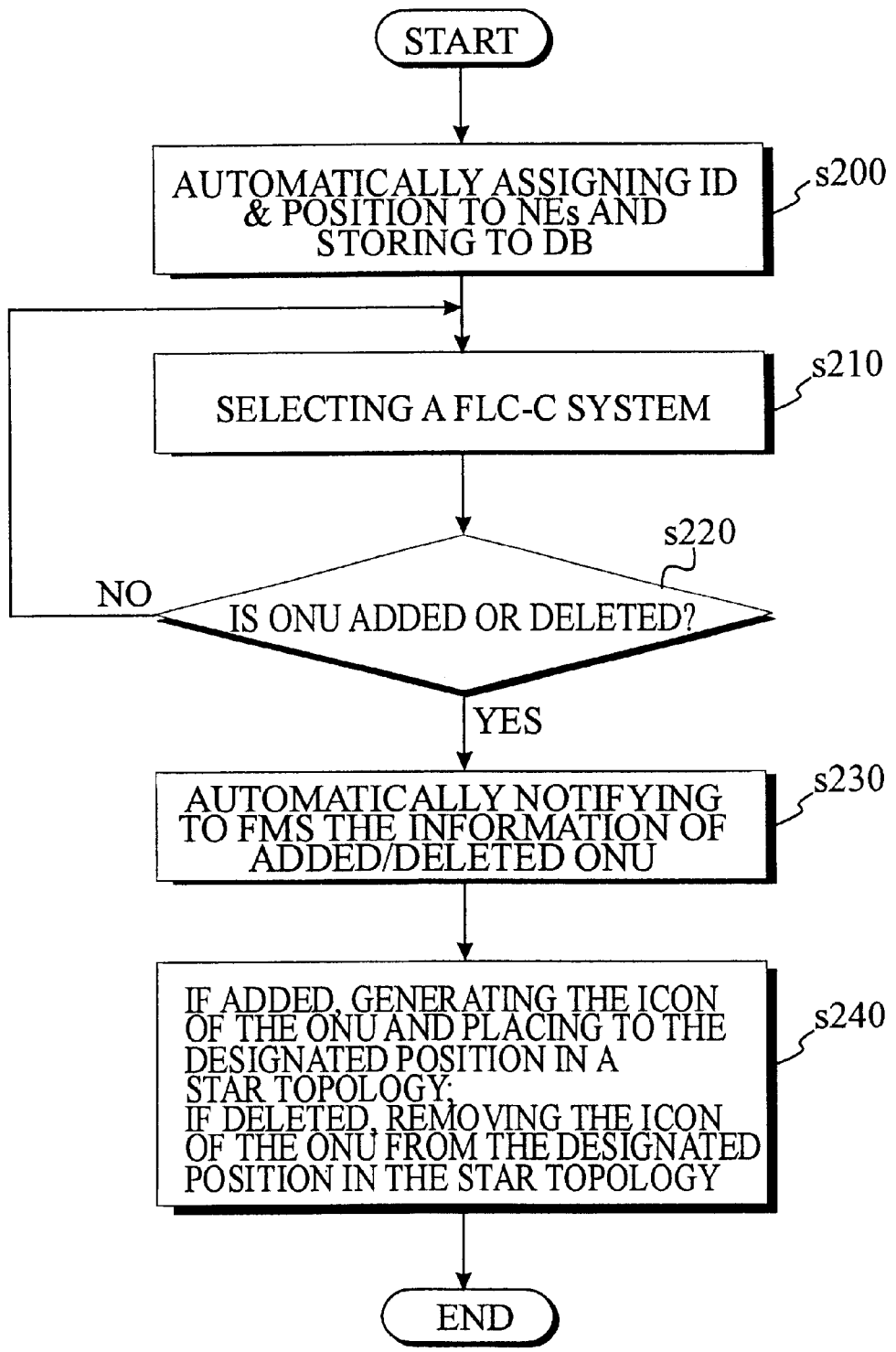
FIG. 3 illustrates a flow chart of a method according to the present invention for automatically discovering the network elements and positioning them.

FIG. 3 illustrates a flow chart of a method for automatically discovering and positioning network elements according to the present invention. As illustrated, the management system assigns identification numbers and position information to each network element in a plurality of fiber loop carrier-curb systems and stores the information in a management system database (s200). A network operator of the management system uses a graphic user interface menu to select a single fiber loop carrier-curb system from among the plurality of fiber loop carrier-curb systems to automatically discover the position of network elements of the selected fiber loop carrier-curb system (s210). The method of the present invention next confirms whether optical network units of the selected fiber loop carrier-curb system were added or deleted (s220), and then notifies the management system regarding the confirmation information. (s230). If optical network units are added, the management system generates an icon for each newly added optical network unit and places it in a determined position of the network topology. If optical network units are deleted, however, the management system deletes the corresponding icons of the optical network units that existed in the determined position of the network topology (s240).

Figure 4:
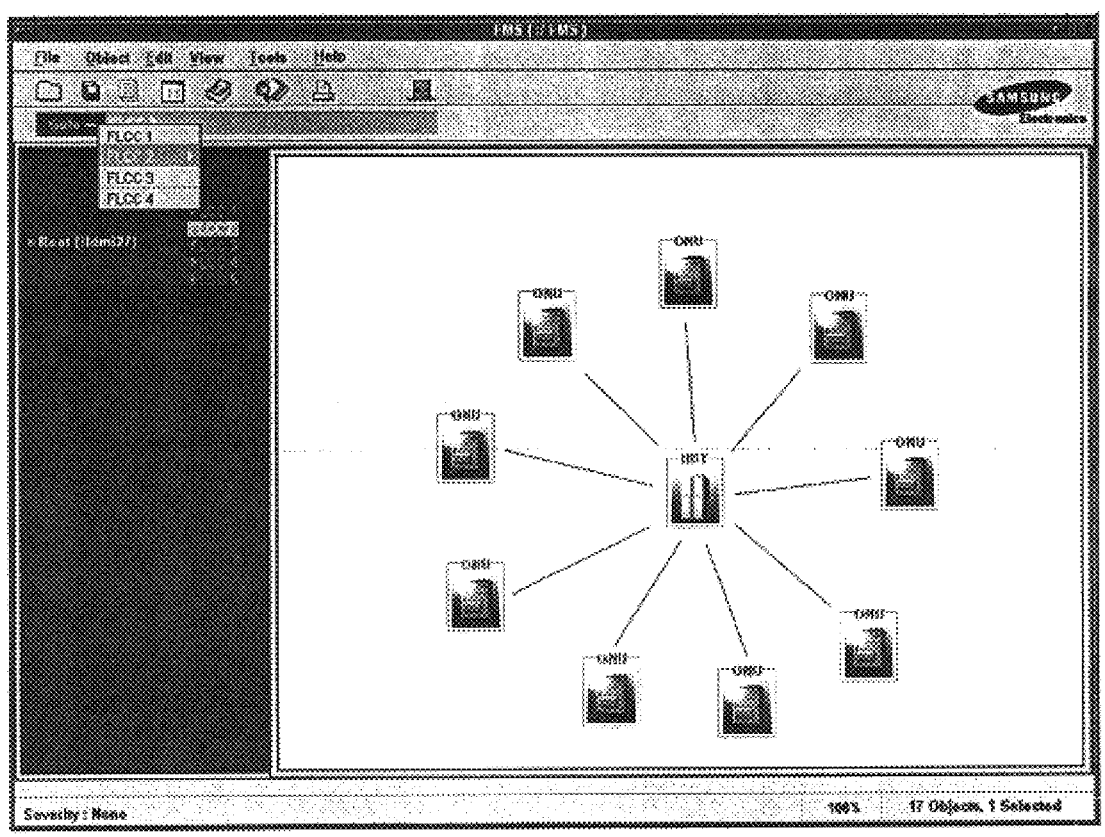
FIG. 4 illustrates a screen configured according to the present invention.

FIG. 4 illustrates the topology of the present invention is in the form of a star with the optical network units located around the host digital terminal in the form of a circle. The host digital terminal is connectable to a maximum of 16 optical network unit's, accessible by users or network operators.

Thus, the forgoing paragraphs describe a method for configuring a network topology in the fiber loop carrier-curb (FLC-C) management system (FMS). More specifically, the present invention is related to a method for automatically discovering and displaying the added or deleted Network Elements (NE's) in the network map topology screen among the configuration management (CM) screens of the management system, and automatically positioning the discovered network elements on the screen map in the form of the star topology. The present invention displays, on a graphic user interface screen, optical network unit's in the form of icons that are configured and linked automatically around a host digital terminal in a star topology. Added or deleted network elements are discovered automatically by the management system. The present invention further avoids network element icons that are aligned vertically as well as the requirement to reposition the icons manually.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method for automatic discovery and positioning of network elements, said method comprising:

a fiber loop carrier-curb network management system having a plurality of fiber loop carrier-curb optical network systems, a host digital terminal for each fiber loop carrier-curb optical network system, and a plurality of optical network units, said fiber loop carrier-curb network management system performing the steps of:

automatically assigning an identification number and a position on a variable visual display to each network element of a plurality of fiber loop carrier-curb optical network systems and storing the information of each said identification number and position to a database of said fiber loop carrier-curb network management system;

designating a selected one of a fiber loop carrier-curb optical network system from said plurality of fiber loop carrier-curb optical network systems for automatic discovery of optical network units in said selected fiber loop carrier-curb optical network system;

making a determination as to whether optical network units of said selected fiber loop carrier-curb optical network system are added or deleted, and automatically notifying the information about said determination to said fiber loop carrier-curb network management system;

when said determination establishes that an optical network unit has been added, automatically generating an icon corresponding to said added optical network unit and placing said generated icon in a designated position of a star network topology; and when said determination establishes that an optical network unit has been deleted, removing the icon corresponding to said optical network unit from said designated position in said star network topology.

2. The method as set forth in claim 1, wherein said optical network units are located around said host digital terminal shaping a circle as represented on said visual display.

3. The method as set forth in claim 1, wherein said network management system is said fiber loop carrier-curb network management system which manages said plurality of fiber loop carrier-curb systems.

4. The method as set forth in claim 3, wherein said host digital terminal is connected to a fiber loop carrier-curb system and said fiber loop carrier-curb network management system.

5. The method as set forth in claim 3, wherein said optical network units are operated by users.

6. The method as set forth in claim 4, wherein said host digital terminal is connected to a maximum of 16 optical network units.

7. The method as set forth in claim 1, wherein said fiber loop carrier-curb network management system manages a plurality of small-sized networks or sub-networks.

8. The method as set forth in claim 7, wherein said sub-networks are fiber loop carrier-curb network systems.

9. An apparatus for automatic discovery and positioning of network elements, said apparatus comprising:

a fiber loop carrier-curb network management system having a plurality of fiber loop carrier-curb optical network systems, a host digital terminal for each fiber loop carrier-curb optical network system, and a plurality of optical network units, said fiber loop carrier-curb network management system having:

means for automatically assigning an identification number and position to all network elements of a plurality of fiber loop carrier-curb optical network systems and storing the information of said identification number and position to a database of said fiber loop carrier-curb network management system;

means for selecting one of a fiber loop carrier-curb optical network system from said plurality of fiber loop carrier-curb optical network systems for automatic discovery of optical network units in said selected fiber loop carrier-curb optical network system;

means for confirming whether optical network units of said selected fiber loop carrier-curb optical network system are added or deleted, and automatically notifying the information about said confirmation to said fiber loop carrier-curb network management system;

if optical network units are added, means for automatically generating icons of said added optical network units and placing said generated icons in a designated position of a star network topology; and if optical network units are deleted, means for removing the corresponding icons of said optical network units from said designated positions in said star network topology.

10. The apparatus as set forth in claim 9, wherein said optical network units are located around said host digital terminal shaping a circle.

11. The apparatus as set forth in claim 9, wherein said network management system is said fiber loop carrier-curb network management system which manages said plurality of fiber loop carrier-curb systems.

12. The apparatus as set forth in claim 11, wherein said host digital terminal is connected to a fiber loop carrier-curb system and said fiber loop carrier-curb network management system.

13. The apparatus as set forth in claim 11, wherein said optical network units are operated by users.

14. The apparatus as set forth in claim 12, wherein said host digital terminal is connected to a maximum of 16 optical network units.

15. The apparatus as set forth in claim 9, wherein said fiber loop carrier-curb network management system manages a plurality of small-sized networks or sub-networks.

16. The apparatus as set forth in claim 15, wherein said sub-networks are fiber loop carrier-curb network systems.

* * * * *